US012605844B2

(12) United States Patent
Zhang et al.

(10) Patent No.: US 12,605,844 B2
(45) Date of Patent: Apr. 21, 2026

(54) METHOD AND APPARATUS FOR POSITION ALIGNMENT OF ROBOTIC ARM, AS WELL AS ELECTRONIC DEVICE

(71) Applicants:Vostro Medical Technology (Tianjin) Co., Ltd, Tianjin Pilot Free Trade Zone (CN); The Second Affiliated Hospital of Army Medical University, Chongqing City (CN)

(72) Inventors: Yuan Zhang, Chongqing City (CN); Mingjun Fu, Tianjin Pilot Free Trade Zone (CN); Long Cui, Shenyang City (CN); Guoqing Yu, Tianjin Pilot Free Trade Zone (CN); Linshuai He, Tianjin Pilot Free Trade Zone (CN); Mingmin Ren, Tianjin Pilot Free Trade Zone (CN); Zhongwei Wang, Tianjin Pilot Free Trade Zone (CN)

(73) Assignees: Vostro Medical Technology (Tianjin) Co., Ltd, Tianjin Pilot Free Trade Zone (CN); The Second Affiliated Hospital of Army Medical University, Chongqing City (CN)

( * ) Notice: Subject to any disclaimer, the term of this patent is extended or adjusted under 35 U.S.C. 154(b) by 0 days.

(21) Appl. No.: 19/235,005

(22) Filed: Jun. 11, 2025

(65) Prior Publication Data

US 2026/0008184 A1     Jan. 8, 2026

(30) Foreign Application Priority Data

Jul. 3, 2024     (CN) ........................ 202410881700.X

(51) Int. Cl.
*B25J 9/16* (2006.01)
*B25J 13/08* (2006.01)

(52) U.S. Cl.
CPC ........... *B25J 9/1697* (2013.01); *B25J 9/1692* (2013.01); *B25J 13/089* (2013.01)

(58) Field of Classification Search
CPC ...... B25J 9/1692; B25J 9/1697; B25J 13/088; B25J 13/089
See application file for complete search history.

(56) References Cited

U.S. PATENT DOCUMENTS

2018/0281143 A1* 10/2018 Albert ................... E04F 21/026
2020/0122332 A1* 4/2020 Harada ................. B25J 9/1635
(Continued)

*Primary Examiner* — Spencer D Patton
(74) *Attorney, Agent, or Firm* — Bay State IP, LLC

(57) ABSTRACT

A method and apparatus for position alignment of a robotic arm, which includes determining initial position information of a target plane targeted by the robotic arm, where the initial position information includes a unit normal vector of the target plane and a preset projection point; controlling the robotic arm to move according to the initial position information of the target plane; acquiring current coordinates of a terminal plane of the robotic arm, and determining a target projection point on the terminal plane and a target normal vector according to the current coordinates; determining a displacement between the terminal plane and the target plane according to the target projection point on the terminal plane and the target normal vector as well as the unit normal vector of the target plane and the preset projection point; and correcting the initial position information of the target plane through the displacement.

6 Claims, 3 Drawing Sheets

(56)            References Cited

U.S. PATENT DOCUMENTS

| | | | |
|---|---|---|---|
| 2022/0152834 A1* | 5/2022 | Kupcsik | B25J 9/1697 |
| 2023/0278221 A1* | 9/2023 | Simon | B25J 9/1692 |
| | | | 700/217 |
| 2025/0229428 A1* | 7/2025 | Liu | B25J 9/1692 |

* cited by examiner

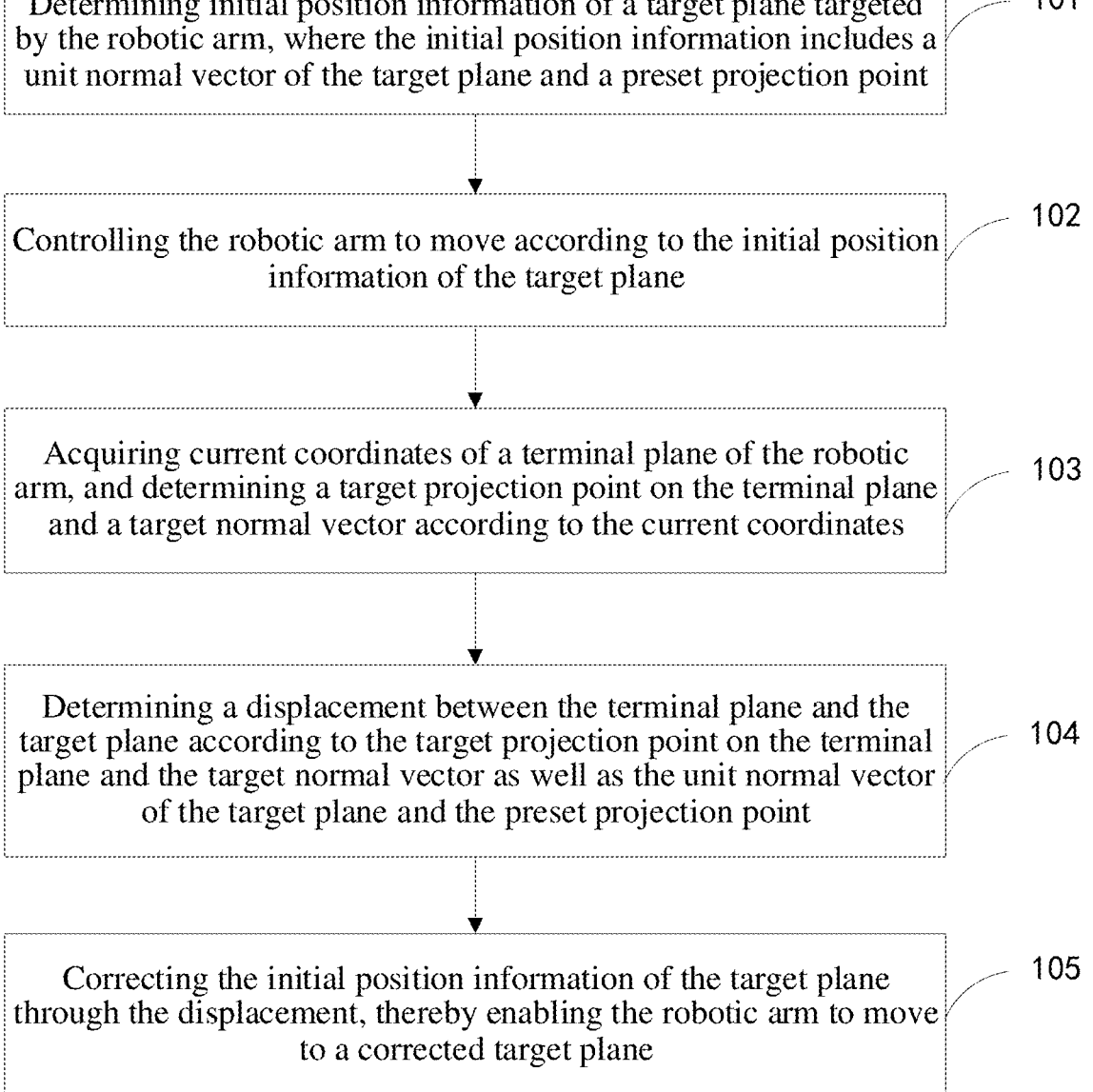

Determining initial position information of a target plane targeted by the robotic arm, where the initial position information includes a unit normal vector of the target plane and a preset projection point ⟋ 101

Controlling the robotic arm to move according to the initial position information of the target plane ⟋ 102

Acquiring current coordinates of a terminal plane of the robotic arm, and determining a target projection point on the terminal plane and a target normal vector according to the current coordinates ⟋ 103

Determining a displacement between the terminal plane and the target plane according to the target projection point on the terminal plane and the target normal vector as well as the unit normal vector of the target plane and the preset projection point ⟋ 104

Correcting the initial position information of the target plane through the displacement, thereby enabling the robotic arm to move to a corrected target plane ⟋ 105

METHOD AND APPARATUS FOR POSITION ALIGNMENT OF ROBOTIC ARM, AS WELL AS ELECTRONIC DEVICE

CROSS REFERENCE TO RELATED APPLICATION

This application claims the benefit of and takes priority from Chinese Patent Application No. 202410881700.X filed on Jul. 3, 2024, the contents of which are herein incorporated by reference.

TECHNICAL FIELD

The present disclosure relates to the technical field of data processing, and in particular to a method and an apparatus for position alignment of a robotic arm, as well as an electronic device.

BACKGROUND

In the field of industrial automation, robotic arms are widely used in various tasks, such as assembly, welding and machining. In the medical field, the robotic arm is mainly used for positioning a target position. Accurate positioning of the robotic arm is crucial for the successful completion of the task. However, due to the presence of factors such as machining and calibration errors, a terminal plane of the robotic arm often cannot reach a target plane accurately, which leads to the decline of positioning accuracy and affects the quality and efficiency of the task.

SUMMARY

The present disclosure provides a method and an apparatus for position alignment of a robotic arm, as well as an electronic device. A motion of the robotic arm can be compensated, and positioning accuracy of the robotic arm can be improved.

In a first aspect, the present disclosure provides a method for position alignment of a robotic arm, including:

determining initial position information of a target plane targeted by the robotic arm, where the initial position information includes a unit normal vector of the target plane and a preset projection point;

controlling the robotic arm to move according to the initial position information of the target plane;

acquiring current coordinates of a terminal plane of the robotic arm, and determining a target projection point on the terminal plane and a target normal vector according to the current coordinates;

determining a displacement between the terminal plane and the target plane according to the target projection point on the terminal plane and the target normal vector as well as the unit normal vector of the target plane and the preset projection point; and correcting the initial position information of the target plane through the displacement, thereby enabling the robotic arm to move to a corrected target plane.

In an example embodiment, determining initial position information of a target plane targeted by the robotic arm includes:

collecting first coordinates of a position where a first positioning tool is located by a binocular camera, where the first positioning tool is disposed adjacent to the target plane and rigidly fixed thereto;

transforming the first coordinates into a world coordinate system according to a coordinate transformation matrix between the binocular camera and the target plane to obtain second coordinates; and determining a first plane equation of the target plane based on the second coordinates, and obtaining a unit normal vector of the target plane and a preset projection point of a preset point on the target plane based on the first plane equation.

In an example embodiment, transforming the first coordinates into a world coordinate system according to a coordinate transformation matrix between the binocular camera and the target plane to obtain second coordinates includes:

transforming the first coordinates into the world coordinate system according to a coordinate transformation matrix between the binocular camera and a second positioning tool to obtain second coordinates, where the second positioning tool is rigidly fixed to the target plane.

In an example embodiment, acquiring current coordinates of a terminal plane of the robotic arm includes:

collecting positioning coordinates on the terminal plane by the binocular camera; and transforming the positioning coordinates into the world coordinate system according to a coordinate transformation matrix between the terminal plane and the binocular camera to obtain the current coordinates.

In an example embodiment, the current coordinates include coordinates of at least three points that are not in a same straight line on the terminal plane, and coordinates of at least one point outside the terminal plane.

According to a method for position alignment of a robotic arm provided by an embodiment of the present disclosure, the displacement between the terminal plane and the target plane can be determined according to position information of the target plane and the terminal plane targeted by the robotic arm, the movement of the robotic arm is controlled according to the displacement, and a position of the target plane relative to the robotic arm after the robotic arm moves is calibrated to make the terminal plane of the robotic arm reach the target plane, thereby improving positioning accuracy of the robotic arm.

In a second aspect, the present disclosure provides an apparatus for position alignment of a robotic arm, including:

a target plane determining module, configured to determine initial position information of a target plane targeted by the robotic arm, where the initial position information includes a unit normal vector of the target plane and a preset projection point;

a robotic arm control module, configured to control the robotic arm to move according to the initial position information of the target plane;

a robotic arm position determining module, configured to acquire current coordinates of a terminal plane of the robotic arm, and determine a target projection point on the terminal plane and a target normal vector according to the current coordinates;

a displacement determining module, configured to determine a displacement between the terminal plane and the target plane according to the target projection point on the terminal plane and the target normal vector as well as the unit normal vector of the target plane and the preset projection point; and a motion compensation module, configured to correct the initial position information of the target plane through the displacement, thereby enabling the robotic arm to move to a corrected target plane.

In an example embodiment, the target plane determining module includes:

a coordinate collecting module, configured to collect first coordinates of a position where a first positioning tool is located by a binocular camera, wherein the first positioning tool is disposed adjacent to the target plane and rigidly fixed thereto;

a coordinate transformation module, configured to transform the first coordinates into a world coordinate system according to a coordinate transformation matrix between the binocular camera and the target plane to obtain second coordinates; and a normal vector determining module, configured to determine a first plane equation of the target plane based on the second coordinates, and obtain a unit normal vector of the target plane and a preset projection point of a preset point on the target plane based on the first plane equation.

In an example embodiment, the coordinate transformation module is configured to:

transform the first coordinates to a world coordinate system according to a coordinate transformation matrix between the binocular camera and a second positioning tool to obtain second coordinates, where the second positioning tool is rigidly fixed to the target plane.

In an example embodiment, the robotic arm position determining module includes:

a robotic arm position collecting module, configured to collect positioning coordinates on the terminal plane by the binocular camera; and a position transforming module, configured to transform the positioning coordinates into the world coordinate system according to a coordinate transformation matrix between the terminal plane and the binocular camera to obtain the current coordinates.

In an example embodiment, the current coordinates include coordinates of at least three points that are not in a straight line on the terminal plane, and coordinates of as least one point outside the terminal plane.

In a third aspect, the present disclosure further provides an electronic device, which includes a memory, and one or more processors. One or more computer programs are stored in the memory, the computer program includes an instruction, and the instruction, when executed by the processor, can enable the electronic device to execute the method for position alignment of a robotic arm in the first aspect.

In a fourth aspect, the present disclosure provides a computer-readable medium, an instruction is stored in the computer-readable medium, and the instruction, when run on an electronic device, can enable the electronic device to execute the method for position alignment of a robotic arm in the first aspect.

In a fifth aspect, the present disclosure provides a computer program product. The computer program product, when run on a computer, can enable an electronic device to execute the method for position alignment of a robotic arm in the first aspect.

It may be understood that the beneficial effects capable of being achieved by the apparatus for position alignment of a robotic arm, the electronic device, the computer-readable medium and the computer program product may refer to the beneficial effects in the first aspect, and thus details are not described in detail here.

BRIEF DESCRIPTION OF THE DRAWINGS

FIG. 1 is a flowchart of a method for position alignment of a robotic arm according to an embodiment of the present disclosure;

DETAILED DESCRIPTION OF THE EMBODIMENTS

Figure 2:
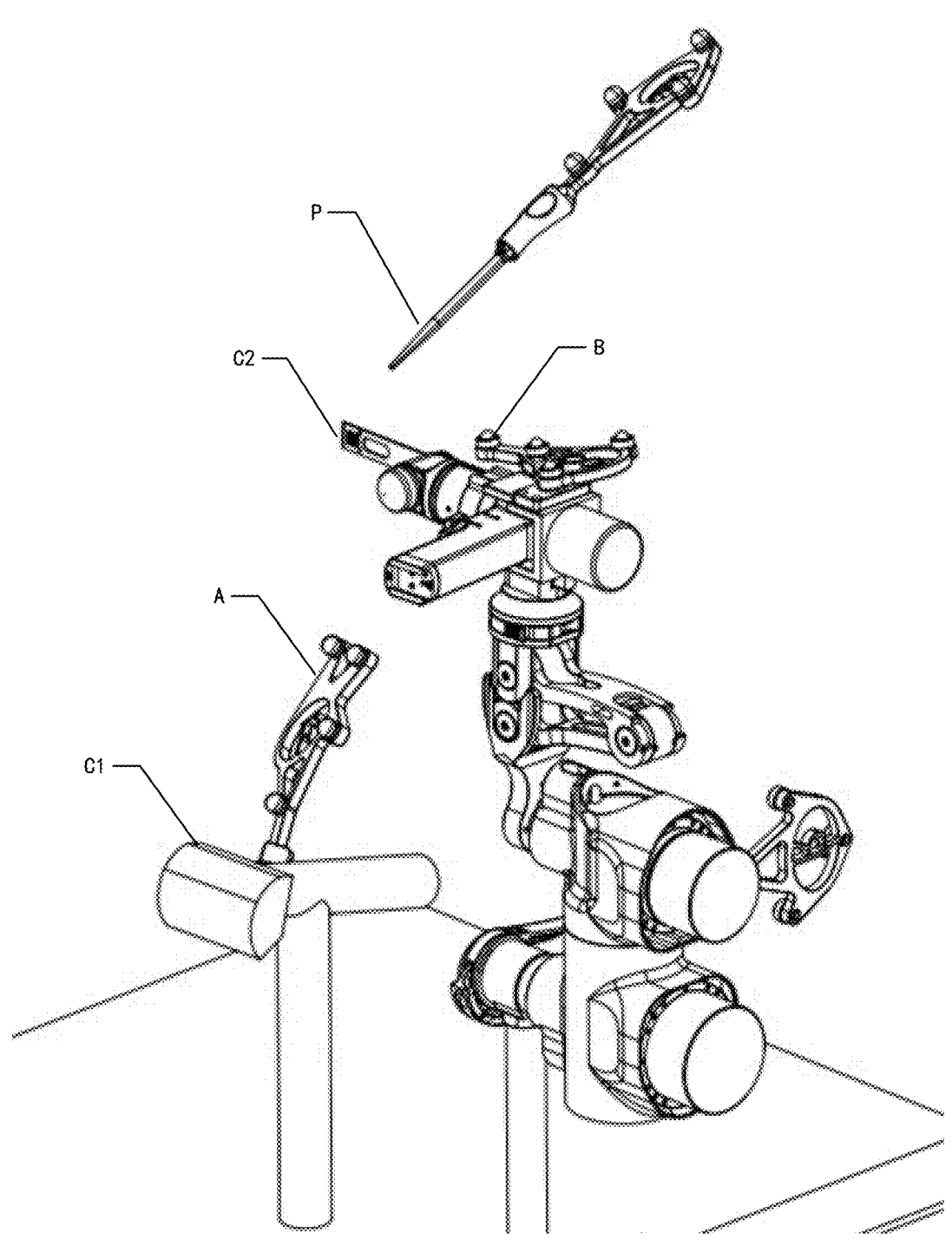
FIG. 2 is a diagram of a positioning tool in a method for position alignment of a robotic arm according to an embodiment of the present disclosure.

To describe the technical solution of embodiments of the present disclosure clearly, the words "first", "second" and the like are used in the embodiments of the present disclosure to distinguish same or similar items with basically same functions and functions. For example, a first chip and a second chip are merely used for distinguishing different chips, and have no limitation on the sequential order thereof. Those skilled in the art may appreciate that the words "first", "second" and the like do not limit the quantity and execution order, and the words "first" and "second" are not necessarily different. It should be noted that in the embodiments of the present disclosure, the words such as "example" or "for example" represent giving an example, an illustration, or a description. Any embodiment or design solution described as "an example" or "for example" in the present disclosure should not be explained as being more preferred or having more advantages than other embodiments or design solutions. To be exact, the words such as "example" or "for example" are used to present related concepts in a specific manner. In the embodiments of the present disclosure, "at least one" means one or more, and "a plurality of" means two or more.

It should be noted that in the embodiments of the present disclosure, "when" may be an instant when a certain situation occurs or a period of time after a certain situation occurs, which is not specifically limited in the embodiment of the present disclosure.

The implementation modes of the embodiment are further described below in detail with reference to accompanying drawings.

This embodiment provides a method for position alignment of a robotic arm, which can monitor the activity of each service function of an application to provide data reference for maintenance and update of the application.

In an example, the method for position alignment of a robotic arm can be applied to a personal computer (PC), a tablet computer, a virtual reality/augmented reality device, a wearable device, an industrial computer, an in-vehicle infotainment system and other electronic devices, or a server, a cloud side, a server cluster, etc., which is not specially limited in this embodiment.

FIG. 1 shows a flowchart of a method for position alignment of a robotic arm according to an embodiment of the present disclosure.

As shown in FIG. 1, the method for position alignment of a robotic arm may include the following steps.

Step 101: Initial position information of a target plane targeted by the robotic arm is determined, where the initial position information includes a unit normal vector of the target plane and a preset projection point.

Step 102: The robotic arm is controlled to move according to the initial position information of the target plane.

Step 103: Current coordinates of a terminal plane of the robotic arm are acquired, and a target projection point on the terminal plane and a target normal vector are determined according to the current coordinates.

Step 104: A displacement between the terminal plane and the target plane is determined according to the target projection point on the terminal plane and the target normal vector as well as the unit normal vector of the target plane and the preset projection point.

Step 105: The initial position information of the target plane is corrected through the displacement, thereby enabling the robotic arm to move to a corrected target plane.

The displacement between the terminal plane and the target plane is determined according to position information of the target plane and the terminal plane targeted by the robotic arm, a position of the target plane relative to the robotic arm after the robotic arm moves is calibrated to compensate the motion of the robotic arm, so that the terminal plane of the robotic arm can reach the target plane, and the positioning accuracy of the robotic arm is improved.

In this embodiment, a position is collected by a binocular camera. To continue to collect the target plane after the robotic arm and the target plane move, a plane position is determined by a positioning tool. As shown in FIG. 2, a positioning tool A is arranged on a target plane C1, a positioning tool B is arranged on a terminal plane C2 of the robotic arm, the positioning tool A forms a rigid fixation on the target plane C1, and the positioning tool B forms a rigid fixation with the terminal plane C2 of the robotic arm.

The positioning tool refers to an object that can be identified and tracked by a camera, there may be multiple positioning tools, and a spatial position and an attitude of the positioning tool relative to the binocular camera can be acquired in binocular vision.

A transformation matrix MA of the positioning tool A from a tool coordinate system to a camera coordinate system and a transformation matrix MB of the positioning tool B from the tool coordinate system to the camera coordinate system can be determined in advance by camera calibration.

In Step 101, the initial position information of the target plane C1 may include a plane equation of the target plane in the world coordinate system, a unit normal vector, and a preset projection point. The preset projection point refers to a preset point on the target plane, which can be arranged according to an alignment requirement. For example, if it is aligned from an upper left corner, a point in the upper left corner of the target plane is taken as the preset projection point.

Specifically, first coordinates of a position where the first positioning tool (i.e., a positioning tool P) is collected by a binocular camera, where the first positioning tool is disposed adjacent to the target plane and rigidly fixed thereto. The first coordinates are transformed into the world coordinate system according to a coordinate transformation matrix between the binocular camera and the target plane to obtain second coordinates. A first plane equation of the target plane is determined based on the second coordinates, and a uniform normal vector of the target plane and a preset projection point of the preset point on the target plane can be obtained based on the first plane equation.

Transforming the first coordinates into the world coordinate system according to a coordinate transformation matrix between the binocular camera and the target plane to obtain second coordinates includes the following steps. The first coordinates are transformed into the world coordinate system according to a coordinate transformation matrix between the binocular camera and a second positioning tool (i.e., positioning tool A) to obtain second coordinates, where the second positioning tool is rigidly fixed to the target plane.

As shown in FIG. 2, the first positioning tool is a positioning tool with a needle-type top end, which is called the positioning tool P. First coordinates of multiple points on the target plane can be collected separately by the positioning tool P. A needle tip of the positioning tool P is held at different positions on the target plane, and then first coordinates P1 of the position where the first positioning tool is located in camera coordinates can be obtained by the binocular camera. Multiple points on the target plane are collected for many times to obtain at least three points P1, P2, P3 that are not in a same straight line. The first coordinates P1, P2, P3 are three-dimensional coordinates of the positioning tool P in the camera coordinate system, and the collected first coordinates P1, P2, P3 are multiplied with an inverse matrix MA INV of the transformation matrix of the target plane, and thus can be transformed into three-dimensional coordinates P1', P2' and P3' in a coordinate system of the positioning tool A. The first coordinates P1, P2 and P3 can be transformed into the world coordinate system according to a coordinate transformation matrix MA between the target plane and the binocular camera to obtain second coordinates P1_new, P2_new, P3_new. Three non-collinear second coordinates P1_new, P2_new, P3_new on the target plane can represent the target plane, which is solved to obtain a first plane equation of the target plane.

Afterwards, the positioning tool P is placed at one side of the target plane, and at a preset distance from the plane, a point P4 outside the target plane is collected to obtain corresponding second coordinates P4_new. P4_new can be used to determine a plane normal vector, with a calculation process as follows.

Firstly, a difference vector from vectors P2_new to P1_new is calculated, which is recorded as v1=P2_new−P1_new. Secondly, a difference vector from vectors P3_new to P1_new is calculated, which is recorded as v2=P3_new−P1_new. A temporary normal vector n of the plane is obtained by taking a cross product of the two obtained difference vectors v1 and v2.

A plane equation is obtained by using the plane normal vector n and a known point P1_new on the plane. Assuming that the plane equation is $Ax+By+Cz+D=0$, where (A, B, C) is a component of the normal vector n, which can be obtained by normalizing the normal vector, $D=-(A*P1\_new.x+B*P1\_new.y+C*P1\_new.z)$, where P1_new.x is a component of the second coordinates P1_new in an x direction, P1_new.y is a component of the second coordinates P1_new in a y direction, and P1_new.z is a component of the second coordinates P1_new in a z direction.

Afterwards, a vertical distance h from a point P4_new to the plane is calculated as follows.

Coordinates of the point P4_new are introduced into the plane equation to calculate a distance h from the point P4_new to the plane, where $h=(A*P4\_new.x+B*P4\_new.y+C*P4\_new.z+D)/sqrt(A^2+B^2+C^2)$.

A projection point O1 (i.e., the preset projection point) is calculated as follows.

Coordinates of the projection point O1 can be obtained by moving the coordinates of the point P4_new by a distance h along a direction of the plane normal vector n, which is specifically expressed as follows: $O1.x=P4\_new.x-h*n.x$, $O1.y=P4\_new.y-h*n.y$, and $O1.z=P4\_new.z-h*n.z$.

Then, a unit normal vector from the projection point O1 to the point P4_new is calculated according to the following steps.

A vector v from the projection point O1 to the point P4_new is calculated, where v=P4_new−O1;

a length ‖v‖ of the vector v is calculated as follows:

$$\|v\| = sqrt\left(v.x^2 + v.y^2 + v.z^2\right);$$

a unit normal vector N1 is calculated as follows:

the vector v is subjected to standardized operation, a length thereof is normalized as 1 to obtain the unit normal vector N1 as follows:

$$N1.x = v.x/\|v\|$$
$$N1.y = v.y/\|v\|$$
$$N1.z = v.z/\|v\|$$

In Step 102, after obtaining the initial position information of the target plane, an angle of each joint of the robotic arm is calculated according to the initial position information, a motor of the robotic arm is controlled to operate to make a tail end of the robotic arm move to a position where the target plane is located.

In Step 103, after the robotic arm moves, current coordinates of the terminal plane C2 of the robotic arm is acquired. Acquiring the current coordinates of the terminal plane of the robotic arm is as follows: positioning coordinates on the terminal plane are collected by the binocular camera; the positioning coordinates are transformed into the world coordinate system according to a coordinate transformation matrix between the terminal plane and the binocular camera to obtain the current coordinates.

The current coordinates of the terminal plane C2 can be collected by the positioning tool P described above. With reference to the method in Step 101, the positioning tool P is placed on the terminal plane to collect positioning coordinates of multiple points on the terminal plane, and then the positioning coordinates are transformed by the coordinate transformation matrix MB between the terminal plane and the binocular camera to obtain current coordinates in the world coordinate system.

In an example, the current coordinates include coordinates of at least three points on the terminal plane, and coordinates of at least one point outside the terminal plane. Then, the coordinates of the at least four points can be used to obtain a second plane equation of the terminal plane, a target projection point O2, and a target normal vector N2. The target normal vector N2 is a unit normal vector of the terminal plane. Specific processes for calculating the second plane equation of the terminal plane, the target projection point O2 and the target normal vector N2 may refer to Step 101, and thus will not be described in detail.

In Step 104, a displacement between the terminal plane and the target plane is determined according to the target projection point on the terminal plane and the target normal vector as well as the unit normal vector of the target plane and the preset projection point, which is specifically as follows.

A position difference between the terminal plane and the target plane is calculated: O_Diff=O1−O2; and a normal vector difference between the terminal plane and the target plane is calculated: N_Diff=N1−N2.

The displacement between the terminal plane and the target plane may include the position difference and the normal vector difference.

In Step 105, a corrected new target plane can be obtained by adding the position difference and the normal vector difference to the position and normal vector of the target plane respectively:

$$O\_new = O\_Diff + O1;$$
$$N\_new = N\_Diff + N1.$$

Afterwards, a joint angle of the robotic arm is recalculated according to the position information of the corrected target plane to control the robotic arm to move to a new position again.

Step 103 to Step 105 are repeated until the displacement between the target plane and the terminal plane is close to or equal to 0.

By adopting the method provided by this embodiment, the terminal plane of the robotic arm can reach the target plane more accurately by means of compensation motion, thereby improving positioning accuracy. In addition, the compensation motion can reduce a problem caused by machining and calibration errors of the robotic arm, thereby improving an operating efficiency of the robotic arm. This embodiment has wide applicability and flexibility by using various types of three-axis robotic arm.

Further, this embodiment further provides an apparatus for position alignment of a robotic arm, which can be used to execute the method for position alignment of a robotic arm described above. Specifically, the apparatus for position alignment of a robotic arm includes:

a target plane determining module, configured to determine initial position information of a target plane targeted by the robotic arm, where the initial position information includes a unit normal vector of the target plane and a preset projection point;

a robotic arm control module, configured to control the robotic arm to move according to the initial position information of the target plane;

a robotic arm position determining module, configured to acquire current coordinates of a terminal plane of the robotic arm, and determine a target projection point on the terminal plane and a target normal vector according to the current coordinates;

a displacement determining module, configured to determine a displacement between the terminal plane and the target plane according to the target projection point on the terminal plane and the target normal vector as well as the unit normal vector of the target plane and the preset projection point; and a motion compensation module, configured to correct the initial position information of the target plane through the displacement, thereby enabling the robotic arm to move to a corrected target plane.

In an example embodiment, the target plane determining module includes:

a coordinate collecting module, configured to collect first coordinates of a position where a first positioning tool is located by a binocular camera, wherein the first positioning tool is disposed adjacent to the target plane and rigidly fixed thereto;

a coordinate transformation module, configured to transform the first coordinates into a world coordinate system according to a coordinate transformation matrix between the binocular camera and the target plane to obtain second coordinates; and a normal vector determining module, configured to determine a first plane equation of the target plane based on the second coordinates, and obtain a unit normal vector of the target plane and a preset projection point of a preset point on the target plane based on the first plane equation.

In an example embodiment, the coordinate transformation module is configured to:

transform the first coordinates to a world coordinate system according to a coordinate transformation matrix between the binocular camera and a second positioning tool to obtain second coordinates, where the second positioning tool is rigidly fixed to the target plane.

In an example embodiment, the robotic arm position determining module includes:

a robotic arm position collecting module, configured to collect positioning coordinates on the terminal plane by the binocular camera; and a position transforming module, configured to transform the positioning coordinates into the world coordinate system according to a coordinate transformation matrix between the terminal plane and the binocular camera to obtain the current coordinates.

In an example embodiment, the current coordinates include coordinates of at least three points that are not in a straight line on the terminal plane, and coordinates of as least one point outside the terminal plane.

Specific details of each module or unit in the foregoing apparatus for position alignment of a robotic arm have been described in detail in the corresponding method for position alignment of a robotic arm, and thus will not be described in detail here.

Figure 3:
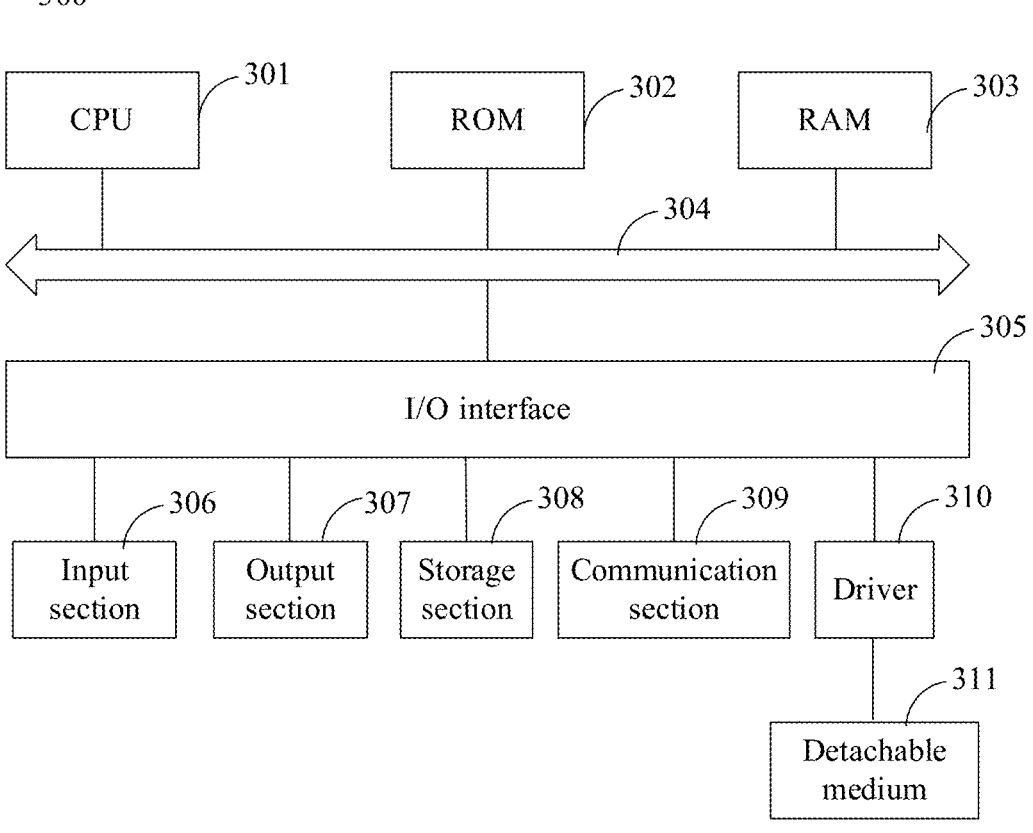
FIG. 3 is a structural diagram of an electronic device according to an embodiment of the present disclosure.

An embodiment of the present disclosure further provides an electronic device, FIG. 3 is a structural diagram of an electronic device suitable for implementing an embodiment of the present disclosure. The electronic device 300 shown in FIG. 3 is only an example, and should not cause any limitation to the function and application scope of the embodiment of the present disclosure.

As shown in FIG. 3, the electronic device 300 may include a central processing unit (CPU) 301, which can execute various appropriate actions and processing according to a program stored in a read-only memory (ROM) 302, or a program loaded into a random-access memory (RAM) 303 from a storage section 308. Various programs and data required for the operation of a system are also stored in the RAM 303. The CPU 301, the ROM 302 and the RAM 303 are connected to one another by a bus 304. An input/output (I/O) interface 305 is also connected to the bus 304.

The following components are connected to the I/O interface 305: an input section 306 including a keyboard, a mouse and the like; an output section 307 including a cathode ray tube (CRT), a liquid crystal display (LCD), a speaker and the like; a storage section 308 including a hard disk and the like; and a communication section 309 including a network interface card such as a LAN (local area network) card, a modem and the like. The communication section 309 executes communication processing via a network such as the Internet. A driver 310 may also be connected to the I/O interface 305 as required. A detachable medium 311, such as a magnetic disk, an optical disk, a magneto-optical disk, semiconductor memory, is installed on the driver 310 as required, so that a computer program read from the detachable medium can be installed into the storage section 308 as required.

In particular, according to an embodiment of the present disclosure, the process described with reference to the flowchart described above may be implemented as a computer software program. For example, an embodiment of the present disclosure includes a computer program product, which includes a computer program borne on a computer readable medium, and the computer program includes program code for executing the method shown in the flowchart. In this embodiment, the computer program may be downloaded from the network and installed by the communication section 309, or installed from the detachable medium 311. The computer program, when executed by the central processing unit (CPU,) is configured to execute the foregoing functions defined in the embodiment of the present disclosure.

For example, the computer program, when executed by the central processing unit (CPU) 301, may be configured to execute the steps as follows. Initial position information of a target plane targeted by the robotic arm is determined, where the initial position information includes a unit normal vector of the target plane and a preset projection point. The robotic arm is controlled to move according to the initial position information of the target plane. Current coordinates of a terminal plane of the robotic arm are acquired, and a target projection point on the terminal plane and a target normal vector are determined according to the current coordinates. A displacement between the terminal plane and the target plane is determined according to the target projection point on the terminal plane and the target normal vector as well as the unit normal vector of the target plane and the preset projection point. The initial position information of the target plane is corrected through the displacement, thereby enabling the robotic arm to move to a corrected target plane.

It should be noted that the computer readable medium disclosed by the present disclosure may be a computer readable signal medium, a computer readable storage medium or any combination of the two. The computer readable storage medium, for example, may be, but is not limited to, an electrical, magnetic, optical, electromagnetic, infrared, or semiconductor system, apparatus or device, or a combination of any of the above. More specific examples of computer readable storage media may include, but are not limited to, an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer readable storage medium may be any tangible medium including or for storing a program, and the program can be used by or in combination with an instruction execution system, apparatus or device. In the present disclosure, the computer readable signal medium may include a data signal propagated in a baseband or as part of a carrier wave, in which computer readable program codes are carried. This propagated data signal may be in many forms, including, but not limited to, an electromagnetic signal, an optical signal or any suitable combination of the above. The computer readable signal medium may also be any computer readable medium other than the computer readable storage medium, which can send, propagate or transmit a program for use by or in combination with an instruction execution system, apparatus or device. The program code on the computer readable medium may be transmitted using any appropriate medium, which includes, but is not limited to: wireless, an optical cable, a RF (radio frequency), etc., or any suitable combination of the above.

The flowchart and block diagram in the accompanying drawings illustrate the architecture, functions and operations capable of being implemented by the systems, methods and computer program products according to various embodiments of the present disclosure. In this regard, each block in the flowchart or block diagram may represent a module, a program segment, or a part of code that contains one or more executable instructions for implementing specified logical functions. It should also be noted that in some alternative implementations, the functions noted in the blocks may occur in a different order than those noted in the accompanying drawings. For example, two blocks shown in succession can actually be executed substantially in parallel, and sometimes can be executed in a reverse order, depending on the functions involved. It should also be noted that each block in the block diagram and/or flowchart, and a combination of blocks in the block diagram and/or flowchart, can be implemented by a dedicated hardware-based system for executing specified functions or operations, or by a combination of dedicated hardware and computer instructions.

The units involved in the embodiments of the present disclosure may be implemented by software or hardware, and the described units may also be arranged in the processor. Names of these units do not constitute the limitation of the unit itself in some cases.

In another aspect, the present disclosure further provides a computer readable medium, the computer readable medium may be included in the electronic device described in the foregoing embodiment, or exist alone without being assembled into the electronic device. The computer readable medium carries one or more programs, and the one or more programs include an instruction, and the instruction, when executed by the electronic device, enables the electronic device to execute the method shown in the foregoing embodiment.

It should be noted that although multiple modules or units of a device for action execution are mentioned in the foregoing detailed description, this division is not mandatory. In practice, according to the embodiments of the present disclosure, the features and functions of two or more modules or units described above may be embodied in one module or unit. Conversely, the features and functions of the one module or unit described above may further be embodied by multiple modules or units.

The foregoing is merely specific embodiment of the present disclosure. However, the scope of protection of the present disclosure is not limited thereto. Any change or replacement within the technical scope disclosed by the present disclosure shall fall within the scope of protection of the present disclosure. Therefore, the scope of protection of the present disclosure shall be subject to the scope of protection of the claims.

What is claimed is:

1. A method for position alignment of a robotic arm, comprising:

determining initial position information of a target plane targeted by the robotic arm, wherein the initial position information comprises a unit normal vector of the target plane and a preset projection point;

controlling the robotic arm to move according to the initial position information of the target plane;

acquiring current coordinates of a terminal plane of the robotic arm, and determining a target projection point on the terminal plane and a target normal vector according to the current coordinates;

determining a displacement between the terminal plane and the target plane according to the target projection point on the terminal plane and the target normal vector as well as the unit normal vector of the target plane and the preset projection point; and correcting the initial position information of the target plane through the displacement, thereby enabling the robotic arm to move to a corrected target plane; wherein determining initial position information of a target plane targeted by the robotic arm comprises:

collecting first coordinates of a position where a first positioning tool is located by a binocular camera, wherein the first positioning tool is disposed adjacent to the target plane and rigidly fixed thereto;

transforming the first coordinates into a world coordinate system according to a coordinate transformation matrix between the binocular camera and the target plane to obtain second coordinates; and determining a first plane equation of the target plane based on the second coordinates, and obtaining a unit normal vector of the target plane and a preset projection point of a preset point on the target plane based on the first plane equation;

transforming the first coordinates into a world coordinate system according to a coordinate transformation matrix between the binocular camera and the target plane to obtain second coordinates comprises:

transforming the first coordinates into the world coordinate system according to a coordinate transformation matrix between the binocular camera and a second positioning tool to obtain second coordinates, wherein the second positioning tool is rigidly fixed to the target plane.

2. The method for position alignment of a robotic arm according to claim 1, wherein acquiring current coordinates of a terminal plane of the robotic arm comprises:

collecting positioning coordinates on the terminal plane by the binocular camera; and transforming the positioning coordinates into the world coordinate system according to a coordinate transformation matrix between the terminal plane and the binocular camera to obtain the current coordinates.

3. The method for position alignment of a robotic arm according to claim 2, wherein the current coordinates comprise coordinates of at least three points that are not in a same straight line on the terminal plane, and coordinates of at least one point outside the terminal plane.

4. An apparatus for position alignment of a robotic arm, used to implement the method for position alignment of a robotic arm according to claim 1, comprising:

a target plane determining module implemented on one or more processors and configured to determine initial position information of a target plane targeted by the robotic arm, wherein the initial position information comprises a unit normal vector of the target plane and a preset projection point;

a robotic arm control module implemented on one or more processors and configured to control the robotic arm to move according to the initial position information of the target plane;

a robotic arm position determining module implemented on one or more processors and configured to acquire current coordinates of a terminal plane of the robotic arm, and determine a target projection point on the terminal plane and a target normal vector according to the current coordinates;

a displacement determining module implemented on one or more processors and configured to determine a displacement between the terminal plane and the target plane according to the target projection point on the terminal plane and the target normal vector as well as the unit normal vector of the target plane and the preset projection point; and a motion compensation module implemented on one or more processors and configured to correct the initial position information of the target plane through the displacement, thereby enabling the robotic arm to move to a corrected target plane; wherein the target plane determining module comprises:

a coordinate collecting module implemented on one or more processors and configured to collect first coordinates of a position where a first positioning tool is located by a binocular camera, wherein the first positioning tool is disposed adjacent to the target plane and rigidly fixed thereto;

a coordinate transformation module implemented on one or more processors and configured to transform the first coordinates into a world coordinate system according to a coordinate transformation matrix between the binocular camera and the target plane to obtain second coordinates; and a normal vector determining module implemented on one or more processors and configured to determine a first plane equation of the target plane based on the second coordinates, and obtain a unit normal vector of the target plane and a preset projection point of a preset point on the target plane based on the first plane equation;

the coordinate transformation module is configured to:

transform the first coordinates into the world coordinate system according to a coordinate transformation matrix between the binocular camera and a second positioning tool to obtain second coordinates, wherein the second positioning tool is rigidly fixed to the target plane.

5. The apparatus for position alignment of a robotic arm according to claim 4, wherein the robotic arm position determining module comprises:

a robotic arm position collecting module implemented on one or more processors and configured to collect positioning coordinates on the terminal plane by the binocular camera; and a position transformation module implemented on one or more processors and configured to transform the positioning coordinates into the world coordinate system according to a coordinate transformation matrix between the terminal plane and the binocular camera to obtain the current coordinates.

6. An electronic device, comprising a processor and a memory, wherein one or more computer programs are stored in the memory and comprise an instruction, and the instruction, when executed by the electronic device, is configured to enable the electronic device to execute the method for position alignment of a robotic arm according to claim 1.

* * * * *